S. A. COFFEY AND J. B. ERNSDORFF.
MOTOR VEHICLE.
APPLICATION FILED MAY 27, 1921.

1,433,122.

Patented Oct. 24, 1922.
2 SHEETS—SHEET 1.

Inventors
Samuel A. Coffey
John B. Ernsdorff
By Herbert E. Smith
Attorney

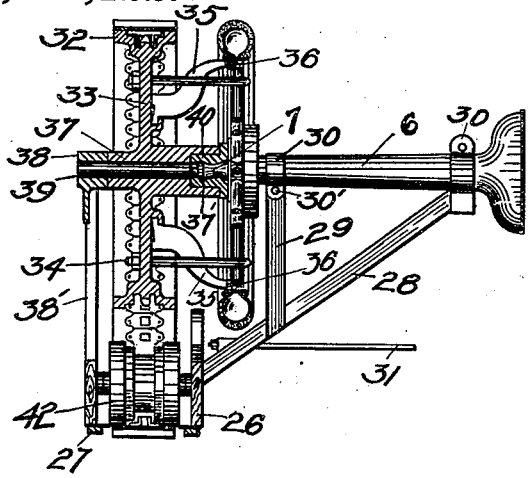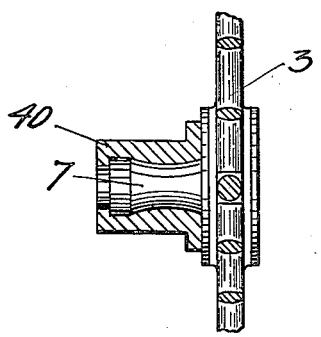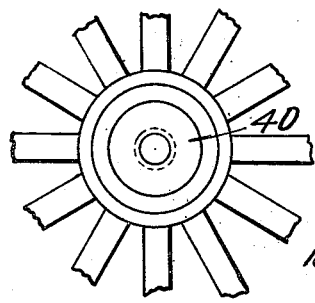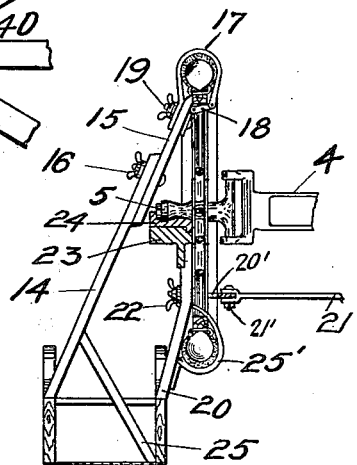

Patented Oct. 24, 1922.

1,433,122

UNITED STATES PATENT OFFICE.

SAMUEL A. COFFEY AND JOHN B. ERNSDORFF, OF YAKIMA, WASHINGTON.

MOTOR VEHICLE.

Application filed May 27, 1921. Serial No. 472,990.

*To all whom it may concern:*

Be it known that we, SAMUEL A. COFFEY and JOHN B. ERNSDORFF, citizens of the United States, residing at Yakima, in the county of Yakima and State of Washington, have invented certain new and useful Improvements in Motor Vehicles, of which the following is a specification.

Our present invention relates to improvements in motor vehicles of the sled type, involving traction and steering wheel attachments, and a traction belt or chain for each of the traction wheels, whereby a wheeled motor vehicle may be converted for use as a power driven sled. The primary object of the invention is the provision of attachments to be substituted for or used in connection with the steering and traction wheels of an automobile by means of which the usual types of automobiles may be equipped with sleds and power driving devices for passage over snow covered countries. Thus the devices comprising the attachments may be affixed to the steering wheels and traction wheels as temporary means for conveying the vehicle to its destination, then may be detached and applied to a second vehicle for return to the starting point, or the attachments may be utilized throughout a season for sleds or runners of an automobile, as desired.

The invention consists in certain novel combinations and arrangements of parts whereby the attachments may with facility be affixed to or detached from a wheeled motor vehicle, and in novel means for supporting the vehicle and transmitting the power from the power plant of the vehicle through its traction wheels to the traction belts or chains forming the driving means for the converted vehicle.

In the accompanying drawings we have illustrated one complete example of the physical embodiment of our invention, wherein the parts are combined and arranged acording to the best mode we have thus far devised for the practical application of the principles of our invention.

Figure 4 is an enlarged vertical sectional view at line 4—4 of Figure 1 showing the traction device and transmission of power thereto from the rear or driving axle.

Figure 5 is a sectional view at line 5—5 of Figure 1 showing the steering sled at one side of the car and its connection with the steering wheel.

Figure 6 is a detail sectional view, enlarged, showing an auxiliary driving hub forming a connection between the hub of the traction wheels of the car and the hub of the driving sprocket wheel of the traction belt.

Figure 7 is a face view of the device in Figure 6.

Figure 1:
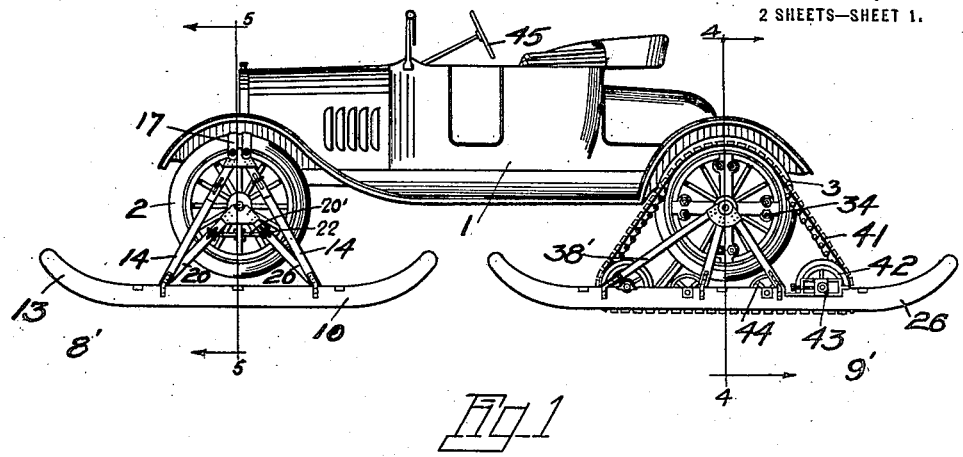
Figure 1 is a view in side elevation showing a well known type of passenger automobile equipped with the devices forming the subject matter of our invention.
Figure 2:
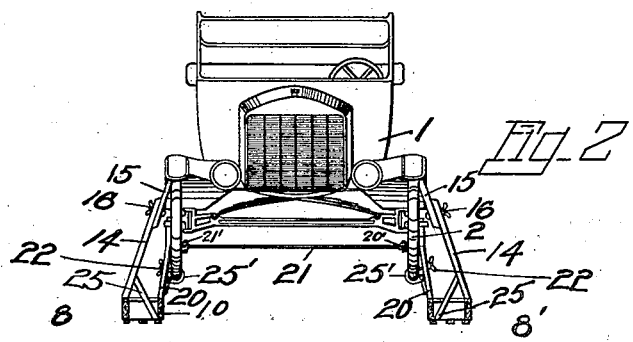
Figure 2 is a view at the front of the vehicle showing the front runners or sleds in their relation to the automobile.
Figure 3:
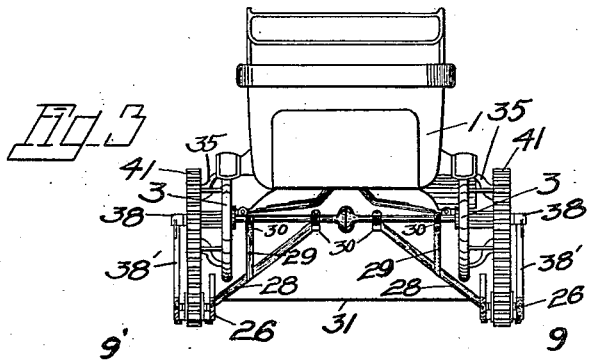
Figure 3 is a rear view of the car showing the equipment of the traction sleds.

In the preferred form of the invention as shown in the drawings we have equipped a Ford car and indicated several parts thereof in order that the relation of my invention thereto may readily be understood. For this purpose we have designated the body as 1 the front steering wheels as 2, and the rear wheels or driving wheels as 3. The steering wheels 2 on the front axle 4 are utilized to steer the converted vehicle and the hub 5 of the steering wheels is also employed in connecting the attachment at the front of the car. At the rear of the car the rear axle 6 and hubs 7 of the rear wheels are utilized for connection of the traction sleds.

The front or steering sleds are designated as a whole by the numerals 8 and 8′ and the traction or driving sleds at the rear of the car are designated as a whole by the numbers 9 and 9′, the former being manipulated from the steering post through the usual connections to the front wheels, and the latter driven from the rear axle as will be described.

The front or steering sleds each include a pair of longitudinally disposed, parallel runners 10, preferably of wood, spaced a suitable distance apart and joined at their lower edges by the sled bottom 11, and along the under face of the bottom are disposed anti-skidding cleats 12 which extend longitudinally of the bottom for engagement with the snow surface to facilitate guiding or steering of the vehicle.

As seen in Figure 1 the front and rear ends of the runners of the sleds are curved upwardly as at 13, and the bottoms of the sleds which also curve upwardly prevent ingress of snow to the space between the runners, thus preventing accumulation of an added weight, and protecting the operating parts of the driving or traction sleds 9 9'.

Each of the front sleds is attached to and movable for steering the vehicle with one of the front or steering wheels of the car, and to this end the front sleds are equipped with extensible arch bars composed of sections 14 and 15 whose adjoining ends are connected by clamp bolts 16 as best seen in Figure 5. These extensible bars, at their lower ends are affixed to the outer runners of the sleds, and incline toward the wheel 2 with a shackle 17 on each bar embracing the tire of the wheel. A flexible or link connection is made at 19 between the shackle and arch bar, and a clamp bolt 19 at the other end of the shackle is utilized to fasten the detachable end of the shackle to the end of the arch bar.

These bars are utilized to attach the outer runners of the front sleds to the upper portions of the wheels, and the inner runners of these sleds are provided with complementary arches formed of converging bars 20. The bars 20 of each arch are connected outside the wheel by a longitudinally extending angle arm 20' secured to the bars by bolts and nuts 22. These arms fit around a wheel spoke, and they are pivotally connected by a transversely extending strut or rod 21, the pivots 21' being directly below and in line with the stubs or pintles of axle 4.

The outer arch bars and the inner complementary arch bars, together with the struts which pass through the front wheels between the spokes thereof, are thus joined together and each sled is joined to a front wheel in such manner as to form a rigid steering element movable with the front wheels as they are turned in usual manner for steering the vehicle. At 23 each of the front sleds is provided with a cap plate on the inner arch bars 20, and a hub plate 24 is seated in this cap plate to receive and support the hub 5 of the front wheel, one of these supports being provided for each wheel. Diagonal brace rods 25 may be used for strengthening the sleds and straps 25' may be used on the inner sides of the inner arch bars 20 to embrace the front wheels as shown in Figure 5.

The traction sleds at the rear of the vehicle are also made up of longitudinally extending, vertically disposed, spaced, parallel runners, indicated as 26, the bottom of these sleds being open, but anti-skidding cleats 27 are disposed longitudinally of the sleds to prevent lateral sliding. All the sleds are disposed at the outer sides of the wheels, and the runners are located below the wheels to hold the vehicle somewhat elevated from the ground surface.

The rear sleds, as best seen in Figure 4 are rigidly connected with the rear axle 6 by means of diagonal braces 28 and vertical straps 29, the former attached to the inner runner 26 and the latter attached to the diagonal brace, and both these members are detachably connected to the axle by clips 30 which use clamp bolts at 30' for making the connection. A strut 31 extends transversely of the vehicle, below the rear wheels, and connects the diagonal braces 28 to maintain these two frame members in proper position.

Each of the drive sleds includes a comparatively large sprocket wheel 32 having radial spokes 33 that are connected with the spokes of the wheels 3 by means of U-bolts 34, and in addition to the bolts each of the spokes 33 has a spoke arm 35, which may be detachably connected thereto, and flared inwardly from the sprocket wheel for connection at 36 with the rim of the wheel 3. In this manner each wheel 3 is equipped with a sprocket wheel rigidly connected therewith and adapted to revolve with the driving wheel 3.

The hub 37 of the sprocket wheel is alined with the rear axle of the vehicle and a bearing ring 38 supported at the apex of a frame composed of radius rods 38' extending upwardly from the outer runner 26 of each of the rear sleds, is adapted to support a journal 39 on which the hub 37 revolves. This journal bar revolves with the sprocket wheel in the bearing ring 38 and is alined with the rear axle. The hub 37 of the sprocket wheel is fashioned with an enlarged socket 37' to fit over an auxiliary attaching hub 40, which hub in turn fits over the hub 7 of the driving or traction wheel 3 of the automobile. This construction affords a rigid connection of the sprocket wheel with the driving wheel and supports the sprocket wheel and the rear axle through the journal bar 39 in the bearing ring 38 of the sled.

In connection with the large sprocket wheel we employ a traction chain or sprocket belt 41 passing over and engaged by the sprocket wheel for transmission of power and the lower, straight working flight of this traction belt passes longitudinally through the open bottom of the sled in frictional contact with the snow surface, the working face of the belt flight projecting slightly below the runners of the sled as shown in Figure 1.

The traction belt or chain passes under guide rollers 42, 42 located near the respective rear and front ends of the rear sleds, and journaled transversely of said sleds in adjustable bearings 43, in order that slack may be taken up and the working or friction flight of the belt between these two rollers may be held taut. A pair of intermediate guide rollers 44 are also provided to hold the working flight in operative position, these latter rollers having fixed bearings in the sled runners.

The operation and utility of the attachments will be evident from the above description taken in connection with the drawings, and it will be apparent that the vehicle, when equipped with the four sleds may be steered from the steering wheel 45 in Figure 1, to control the two steering sleds 8 and 8'. The power suppled from the automobile motor is transmitted from the rear axle, through the sprocket wheels connected with the driving wheels 3 as described, to the traction belts or chains which have their lower flights in contact with the surface of the snow, and by their tractive power drive the vehicle forward.

Having thus fully described our invention, what we claim as new and desire to secure by Letters Patent is—

The combination in a motor vehicle with a driving wheel, of a sled, a sprocket wheel supported in said sled and provided with radial spokes, U-bolts affixing said spokes to the spokes of said driving wheel, an attaching hub fitted over the hub of said driving wheel, a recessed hub on the sprocket wheel to fit over said attaching hub, a traction belt on said sprocket wheel, and spaced guide rollers in said sled for the belt.

In testimony whereof we affix our signatures.

SAMUEL A. COFFEY.
JOHN B. ERNSDORFF.